No. 738,698. PATENTED SEPT. 8, 1903.
L. J. RENOY.
BOILER FOR COOKING PURPOSES.
APPLICATION FILED MAR. 6, 1903.
NO MODEL.
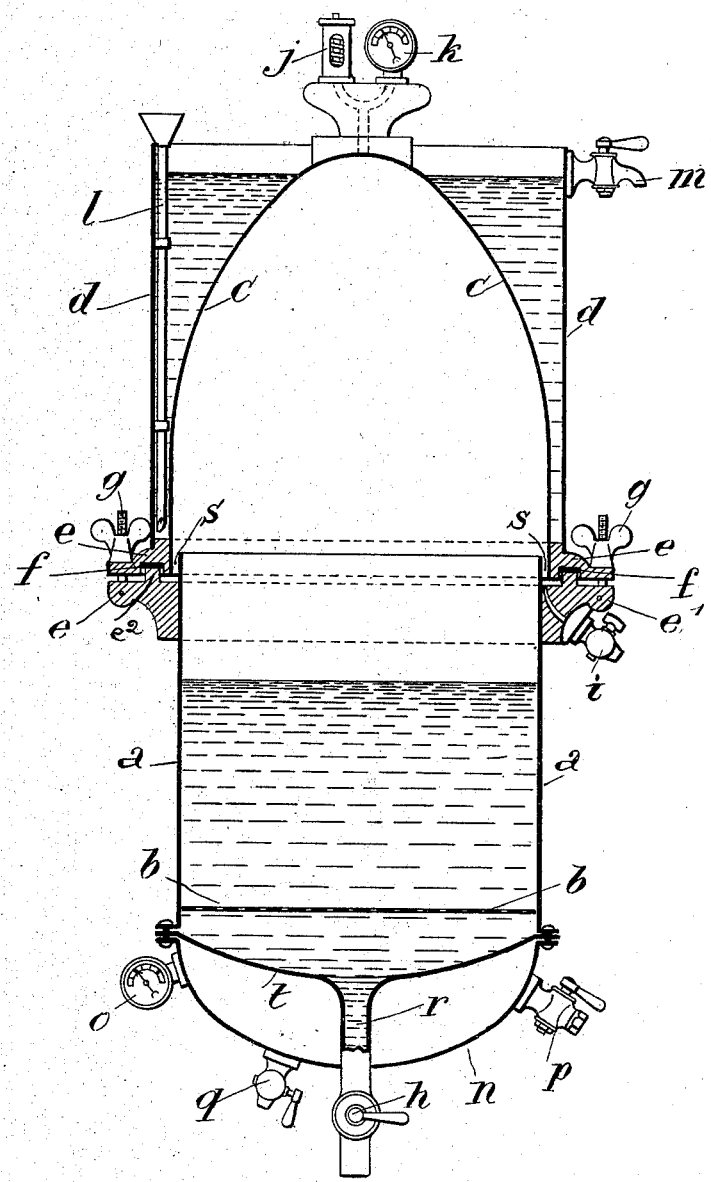
Witnesses:
Geo. Heinicke
F. Dittmar
Inventor:
Louis Joseph Renoy
per G. Dittmar
Attorney

UNITED STATES PATENT OFFICE.

LOUIS JOSEPH RENOY, OF AUCH, FRANCE.

BOILER FOR COOKING PURPOSES.

SPECIFICATION forming part of Letters Patent No. 738,698, dated September 8, 1903.

Application filed March 6, 1903. Serial No. 146,558. (No model.)

*To all whom it may concern:*

Be it known that I, LOUIS JOSEPH RENOY, a citizen of the Republic of France, residing at Auch, in the Republic of France, have invented certain new and useful Improvements in Boilers for Cooking Purposes, (for which I have applied for a patent in France, dated February 6, 1903, and in Great Britain, dated September 9, 1902;) and I do hereby declare the following to be a full, clear, and exact description of the invention, such as will enable others skilled in the art to which it appertains to make and use the same.

The present invention relates to a boiler for cooking food, concentrating gravies, or the like, and mainly consists of a receptacle closed by a cover of the form of a pointed arch which is surrounded by a cylindrical casing, the whole being arranged in such a manner that the cooking temperature can be regulated according to requirements and that the steam-pressure, forming itself in the receptacle, can be kept in a determined degree.

The chief advantages which arise from this invention are, first, quicker cooking of all food, and consequently smaller expenses in fuel, and, second, the preservation of nearly all the aromatic and azotic parts which get lost with cooking methods generally used.

The heating of the boiler can be effected by steam or by any other heat-generating device; but in the latter case the boiler has only a single bottom without any auxiliary contrivances, instead of a double one, as later on described.

A boiler heated by steam and according to this invention is represented in the accompanying drawing, which represents a vertical section of a boiler constructed in accordance with my invention.

$a$ represents the receptacle of the boiler in which are placed the water and materials to be cooked. The materials rest upon a perforated plate $b$, which prevents their contact with the bottom $t$ of the receptacle. C is the pointed arched cover of the boiler, which, being inclosed in a cylindrical casing $d$, is fixed to the latter. The casing serves, when quite or partly filled with water, as a cooling device, in order to regulate at will the cooking temperature. The receptacle and the cover, being made of tinned iron plates or any other suitable material, are provided with flanges $e\ e'$. The top one, $e$, has a groove, in which is placed an elastic ring $f$, the flange $e'$ having a projection or rib $e^2$ entering said groove and engaging said ring. Both flanges are tightly connected by screw-bolts $g$, thus uniting the receptacle and the cover. The boiler has, further, an outlet-cock $i$ for releasing the condensed water, which latter itself, inside of the cover during the cooking process, runs from the inner walls of the cover into a channel-like place $s$, left between the receptacle $a$ and the cover C. The cover possesses a safety-valve $j$ and a pressure and temperature indicator $k$.

The free space between the cylindrical casing $d$ and the cover C can be filled with cold water by means of a tube $l$, which is led to the bottom of the casing. The water introduced by this tube may run out again by a cock $m$, thus forming a continuous circulation of the water contained in the cooler.

As shown in the drawing, a second bottom $n$ is fixed to the bottom $t$ of the receptacle in order to heat the boiler by steam.

$o$ indicates a steam-pressure gage; $p$, a steam-inlet cock, and $q$ the steam-outlet cock, fixed to the bottom $n$.

$r$ represents an outlet-tube provided with a cock $h$, fixed to the bottom $t$, in order to release the liquids cooked in the boiler.

The boiler may be a single compartment or one of that form provided with a plurality of partitions dividing the boiler into a plurality of separated independent compartments.

This boiler cooks very quickly, (one hour instead of seven or eight hours is sufficient;) but in this case it is indispensable to bring the temperature to about 120° centigrade, which is easily obtained by a very reduced heat.

The cooking process is regulated by pouring into the cooler $d$ a more or less quantity of cold water, which allows the steam generated within the closed boiler to be condensed to the extent required. The water arising from such condensation is collected by the channel $s$ and let out by its cock $i$.

When the flow of the water on the surface of the cover is stopped, the pressure rises in the interior of the cover; but this pressure is quickly reduced when the flow of the water is set on again.

When the cooking of the food is finished, the heating of the boiler must be stopped, thereby continuing the cooling of the cover by means of the water-flow. The pressure in the boiler is then destroyed, and after having unbolted the cover it can be taken off. If necessary, a sample of the food may be taken, and if the latter is not sufficiently cooked or concentrated the cover need only be put on and closed again, and the operation is carried further by heating the boiler and cooling the cover.

Having thus fully described my invention, what I claim as new, and desire to secure by Letters Patent of the United States, is—

A boiler of the class described comprising a receptacle with flange, an arched cover having a surrounding casing forming a water-jacket, and a flange, means secured within said casing for filling the same, the end of the receptacle fitted loosely within the adjacent end of the cover and extended beyond the same with a space therebetween, and a space communicating therewith between the adjacent edges of the flanges and means for forming a water-tight joint between the flanges of the receptacle and cover, as and for the purpose specified.

In testimony whereof I affix my signature.

LOUIS JOSEPH RENOY.

In presence of—
EMILE GEIMONT,
PAUL FOLLEY.